(12) United States Patent
Gonion

(10) Patent No.: US 10,275,365 B1
(45) Date of Patent: Apr. 30, 2019

(54) CRYPTOGRAPHIC SIGNATURES FOR CAPABILITY-BASED ADDRESSING

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 360 days.

(21) Appl. No.: 15/232,456

(22) Filed: Aug. 9, 2016

Related U.S. Application Data

(60) Provisional application No. 62/311,143, filed on Mar. 21, 2016.

(51) Int. Cl.
  *H04L 9/32* (2006.01)
  *G06F 12/14* (2006.01)

(52) U.S. Cl.
  CPC ........ *G06F 12/1408* (2013.01); *H04L 9/3247* (2013.01); *G06F 2212/1052* (2013.01)

(58) Field of Classification Search
  CPC ......... G06F 12/1408; G06F 2212/1052; H04L 9/3247
  USPC .......................................................... 713/176
  See application file for complete search history.

(56) References Cited

U.S. PATENT DOCUMENTS

| | | | |
|---|---|---|---|
| 7,308,576 B2 * | 12/2007 | Glew | ...................... G06F 21/52 709/229 |
| 8,635,406 B2 | 1/2014 | Greenhalgh et al. | |
| 9,122,873 B2 | 9/2015 | Ghose | |
| 2005/0188214 A1 | 8/2005 | Worley et al. | |
| 2008/0250217 A1 * | 10/2008 | Kershaw | ............. G06F 9/30076 711/163 |
| 2012/0233612 A1 | 9/2012 | Beckett | |
| 2014/0082329 A1 | 3/2014 | Ghose | |
| 2014/0122846 A1 | 5/2014 | Vasekin et al. | |
| 2015/0040224 A1 | 2/2015 | Litva et al. | |
| 2015/0046690 A1 | 2/2015 | Eickemeyer et al. | |
| 2016/0170769 A1 | 6/2016 | LeMay | |
| 2016/0171211 A1 | 6/2016 | Chen | |
| 2016/0188874 A1 | 6/2016 | Oxford et al. | |
| 2016/0378499 A1 | 12/2016 | Burger et al. | |
| 2017/0024559 A1 | 1/2017 | Hughes et al. | |

OTHER PUBLICATIONS

Mickael Cazorla, K'evin Marquet, Marine Minier; "Survey and Benchmark of Lightweight Block Ciphers for Wireless Sensor Networks"; SECRYPT 2013—Proceedings of the International Conference on Security and Cryptography, Jul. 2013, Reykjavik, Iceland. SciTePress, pp. 543-548, 2013. <hal-00918974>; 13 pages.

(Continued)

*Primary Examiner* — Kambiz Zand
*Assistant Examiner* — Benjamin A Kaplan
(74) *Attorney, Agent, or Firm* — Meyertons, Hood, Kivlin, Kowert & Goetzel, P.C.; Lawrence J. Merkel

(57) ABSTRACT

In an embodiment, a processor includes hardware circuitry and/or supports instructions which may cryptographically sign a pointer and its associated capabilities. When the pointer is used to perform a memory operation (read or write), the signed pointer may be authenticated to ensure that unauthorized modification of the pointer or capabilities has not occurred. In response to detecting the modification, the processor may be configured to signal an exception or otherwise initiate error handling to prevent the memory operation from completing.

20 Claims, 3 Drawing Sheets

(56) References Cited

OTHER PUBLICATIONS

Borghoff, Julia, et al. "PRINCE—a low-latency block cipher for pervasive computing applications." International Conference on the Theory and Application of Cryptology and Information Security. Springer Berlin Heidelberg, Dec. 2, 2012 (pp. 208-225); 25 pages.

Watson, Robert NM, et al. "CHERI: a research platform deconflating hardware virtualization and protection." Workshop paper, Runtime Environments, Systems, Layering and Virtualized Environments (RESoLVE 2012) 2012; 8 pages.

Jean, Jérémy, et al. "Security analysis of PRINCE." International Workshop on Fast Software Encryption. Springer Berlin Heidelberg, Mar. 11, 2013 (pp. 92-111); 13 pages.

U.S. Appl. No. 15/202,269, filed Jul. 5, 2016, Yannick L. Sierra et al.; 23 pages.

* cited by examiner

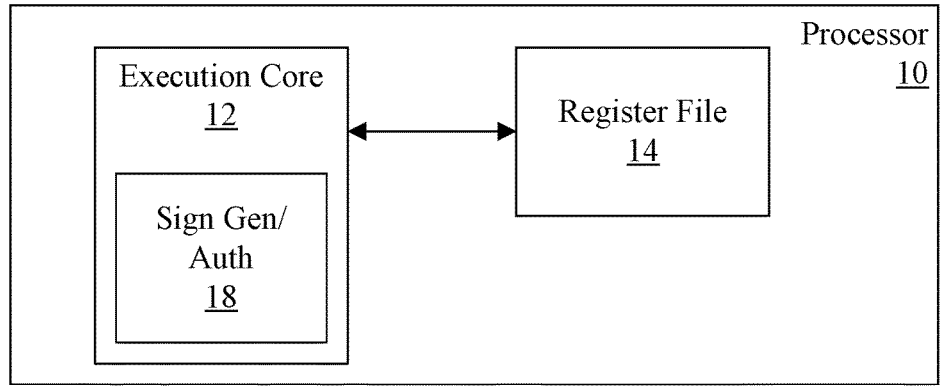
Fig. 1
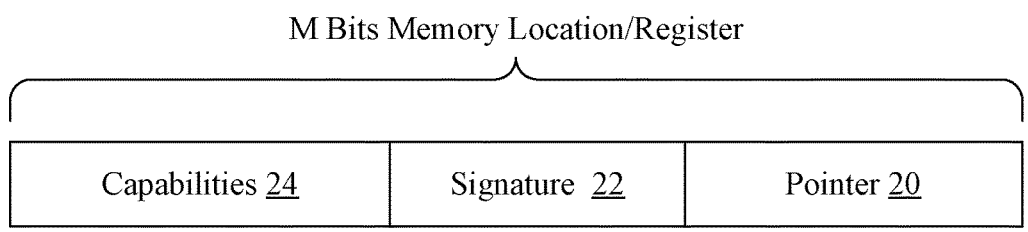
Fig. 2
RT = Sign(RS, Key)
ystp(imm5, Key, RS1, RS2)
yst(imm5, Key, RS1)
Fig. 3

CRYPTOGRAPHIC SIGNATURES FOR CAPABILITY-BASED ADDRESSING

This application claims the benefit of U.S. Provisional Patent Application No. 62/311,143, filed on Mar. 21, 2016, which is incorporated by reference herein in its entirety. To the extent that anything in the provisional application conflicts with material expressly set forth herein, the material expressly set forth herein controls.

BACKGROUND

Technical Field

Embodiments described herein are related to capability-based addressing.

Description of the Related Art

Capability-based addressing is a scheme used to control access to memory. In this scheme, each pointer is annotated with capabilities that control the types of operations and range of addressing that can be accessed using that pointer. The capability annotations are usually protected by storing them in a region of memory that is not addressable by the applications software, to prevent unauthorized modification of the capabilities. Some implementations of capability-based addressing require re-architecting memory systems to add "hidden" memory bits that are not part of the address-map and are managed by hardware. Thus, the cost of implementing capability-based addressing is significant, impeding adoption of the mechanism.

SUMMARY

In an embodiment, a processor includes hardware circuitry and/or supports instructions which may cryptographically sign a pointer and its associated capabilities. When the pointer is used to perform a memory operation (read or write), the signed pointer may be authenticated to ensure that unauthorized modification of the pointer or capabilities has not occurred. In response to detecting the modification, the processor may be configured to signal an exception or otherwise initiate error handling to prevent the memory operation from completing.

BRIEF DESCRIPTION OF THE DRAWINGS

The following detailed description makes reference to the accompanying drawings, which are now briefly described.

FIG. 1 is a block diagram of one embodiment of a processor.

FIG. 2 is a block diagram of one embodiment of a register/memory location for a pointer and associate capabilities.

FIG. 3 is an example of instructions that sign a pointer and capabilities.

Figure 4:
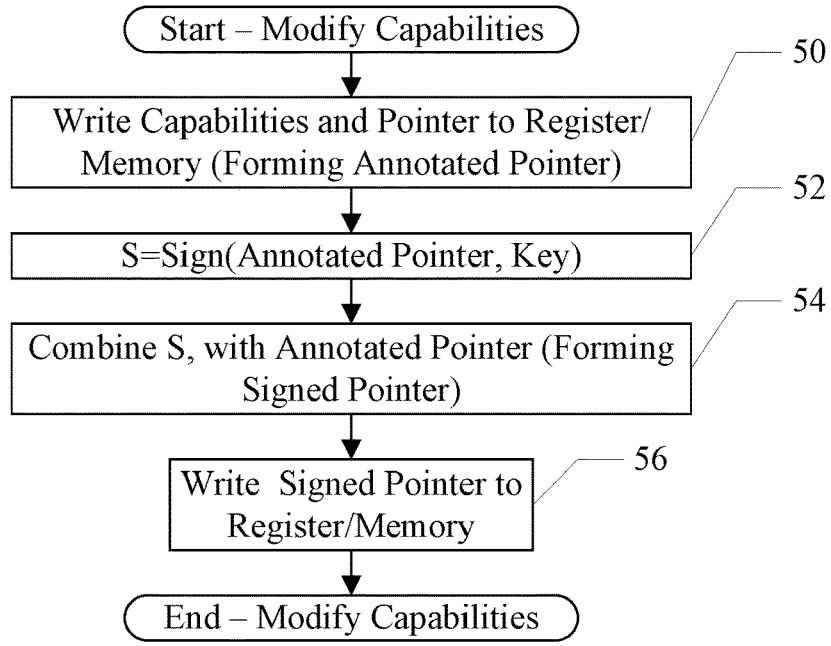
FIG. 4 is a flowchart illustrating the assignment and/or modification of capabilities for a pointer.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as to "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of a processor 10 is shown. In the embodiment of FIG. 1, the processor 10 may include an execution core 12 coupled to a register file 14.

The processor 10 may be representative of a general-purpose processor that performs computational operations. For example, the processor 10 may be a central processing unit (CPU) such as a microprocessor, a microcontroller, an application-specific integrated circuit (ASIC), or a field-programmable gate array (FPGA). The processor 10 may be a standalone component, or may be integrated onto an integrated circuit with other components (e.g. other processors, or other components in a system on a chip (SOC)). The processor 10 may be a component in a multichip module (MCM) with other components.

As illustrated in FIG. 1, the processor 10 may include the execution core 12. The execution core 12 may be configured to execute instructions defined in an instruction set architecture implemented by the processor 10. The execution core 12 may have any microarchitectural features and implementation features, as desired. For example, the execution core 12 may include superscalar or scalar implementations. The execution core 12 may include in-order or out-of-order implementations, and speculative or non-speculative implementations. The execution core 12 may include any combination of the above features. The implementations may include microcode, in some embodiments. The execution core 12 may include a variety of execution units, each execution unit configured to execute operations of various types (e.g. integer, floating point, vector, multimedia, load/store, etc.). The execution core 12 may include different numbers pipeline stages and various other performance-enhancing features such as branch prediction. The execution core 12 may include one or more of instruction decode units, schedulers or reservations stations, reorder buffers, memory management units, I/O interfaces, etc.

The register file 14 may include a set of registers that may be used to store operands for various instructions. The register file 12 may include registers of various data types, based on the type of operand the execution core 12 is configured to store in the registers (e.g. integer, floating point, multimedia, vector, etc.). The register file 14 may include architected registers (i.e. those registers that are specified in the instruction set architecture implemented by the processor 10). Alternatively or in addition, the register file 14 may include physical registers (e.g. if register renaming is implemented in the execution core 12).

One or more of the registers in the register file 14 may store a pointer to be used to access memory. When the register stores a pointer, a corresponding set of capabilities may be annotated to the pointer. The annotation may be in the register, in another register, or a combination of the register and another register. When an additional register is use, the register may be another general purpose register, or the register file may have a corresponding set of capabilities registers that store capabilities. For example, the register file may include capabilities registers in one-to-one correspondence with the general purpose registers. Alternatively, a set of capabilities registers maybe provided and a tag in a general purpose register that stores a pointer may select the correct capabilities register. In addition to having pointers in registers, pointers (annotated with capabilities) may be written to and read from memory as well.

The processor 10 may be configured to perform cryptographic sign and authenticate operations on pointers and their capabilities, to ensure that capabilities are not modified by unauthorized parties (e.g. untrusted software). Because the capabilities are cryptographically signed and authenticated (using a key or keys that are only available to trusted software that is authorized to assign capabilities), the capabilities may be stored in normal, addressable memory and/or registers that are accessible to software. That is, the capabilities may be stored similar to other data and thus microarchitectural changes to hide the capabilities (e.g. in unaddressable memory) may be avoided. Untrusted software may access the capabilities. However, if the untrusted software or any unauthorized party changes the capabilities, the signature may no longer match and thus authentication of the pointer before it is used may fail. Thus, each time the processor 10 attempts to use the pointer, the signature generation/authentication circuit 18 may perform an authentication operation to determine if the signature is valid. If so, the pointer may be used. If not, the pointer may not be used. An exception may be signaled on the instruction that is invoking the pointer, or other error handling may be invoked to prevent access to the pointer and/or the memory location identified by the pointer. Performing a sign operation on a value may be more succinctly referred to herein as "signing" the value. Similarly, performing an authenticate operation on a value may be more succinctly referred to herein as "authenticating."

Generally performing a sign operation or "signing" a pointer and capabilities may refer to applying a cryptographic function to the pointer and capabilities using at least one cryptographic key and optionally using additional data. The result of the cryptographic function is a signature. A corresponding value may be formed that includes at least a portion of: the pointer, the set of capabilities, and the signature resulting from the sign operation (cryptographic function). For example, the value may include a reduced-size signature, as discussed below. The value may include all of the pointer and the capabilities in addition to the reduced-size signature (or the full signature, in other embodiments). The value may include a portion of the pointer, with the excluded bits of the pointer replaced by signature bits. The value may further include a portion of the capabilities, with the excluded bits of the capabilities replaced by signature bits. Another embodiment of the value may include the full pointer and a portion of the capabilities with the excluded bits of the capabilities being replaced with signature bits.

An authenticate operation may be performed on the pointer and capabilities (or the pointer/capabilities may be "authenticated") by applying the cryptographic function again at a later point and comparing the resulting value to the signature. That is, if the pointer/capabilities and/or signature have not been modified, the result of the cryptographic function should equal the signature. Viewed in another way, the authenticate operation may authenticate the value mentioned above, or may authenticate the pointer/capabilities responsive to the value. The cryptographic key may be specific to the trusted software (e.g. operating system (OS) software) that assigns the capabilities, and may not be accessible to other software. Thus the likelihood of an undetected modification of the pointer and/or capabilities by a third party without the key may be exceedingly remote. In an embodiment, the cryptographic key may be generated, at least in part, based on a "secret" that is specific to the instance of the processor 10 and is not accessible except in hardware. In an embodiment, the cryptographic key itself may also not be accessible to software (even the trusted software), and thus the key may remain secret and difficult to discover by an unauthorized party.

The cryptographic sign operation applied to the pointer/capabilities may be an encryption of the pointer/capabilities using the key(s). The encrypted result as a whole may be the signature, or a portion of the result may be the signature (e.g. the signature may be shortened via truncation or shifting). Any encryption algorithm may be used, including a variety of examples given below.

An instruction may be an executable entity defined in an instruction set architecture implemented by the processor 10. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 10. Some instructions may be microcoded, in some embodiments. Accordingly, the term "instruction operation" may be used herein to refer to an operation that an execution unit in the processor 10/execution core 12 is configured to execute as a single entity. Instructions may have a one to one correspondence with instruction operations, and in some cases an instruction operation may be an instruction (possibly modified in form internal to the processor 10/execution core 12). Instructions may also have a one to more than one (one to many) correspondence with instruction operations. An instruction operation may be more briefly referred to herein as an "op."

Turning now to FIG. 2, a block diagram illustrating one embodiment of an M bit memory location or register is shown. M may be an integer greater than zero. More particularly, M may be the architectural size of a virtual address (pointer) in the processor 10 plus the capabilities assigned to that virtual address. For example, some instruction set architectures currently specify 64 bit addresses. The appended capabilities may be 64 more bits, for example, or any other number of additional bits. However, the actual implemented size of the virtual may be less than 64 bits (e.g. 40 to 48 bits of address). Thus, some of the pointer bits are effectively unused in such implementations. The unused bits may be used to store the signature, in an embodiment. Similarly, the capabilities field may include unused bits which may be used to store the signature, or a combination of unused pointer and capabilities bits may be used. Other embodiments may store the signature in another memory location.

In the embodiment of FIG. 2, the implemented portion of the pointer is shown (field 20). A field for the capabilities is also shown (field 24). Unused bits from the pointer field and/or the capabilities field may store the signature (field 22). The signature as generated from the encryption algorithm may be larger than the signature field 22. Accordingly, the signature actually stored for the address may be a portion of the signature. For example, the signature may be truncated. Alternatively, the signature may be right-shifted. Any mechanism for shortening the signature field may be used.

The processor 10 may implement the signature generation and authentication in hardware. For example, signature generation/authentication circuit 18 is shown in FIG. 1 and may include circuitry to sign and authenticate pointers and capabilities. Additionally, there may be instructions defined for the instruction set architecture which cause the signature to be generated or authentication to be performed. FIG. 3 illustrates embodiments of instructions for signature generation.

FIG. 3 illustrates several embodiments of signature generation instructions. For example a Sign instruction takes a source register (RS) and a key as input operands. The key may be stored in a hardware-accessible register or other storage device for access by the hardware only, in an embodiment, or may be accessible to trusted software. The key may be one key, or multiple keys, depending on the encryption algorithm that is implemented by the processor 10.

The Sign instruction may be a privileged instruction that may only be successfully executed by software executing with a sufficiently high privilege level. Alternatively, as mentioned previously, access to the key used to sign pointers and capabilities may be restricted. The processor 10, when executing a sign instruction, may apply an encryption algorithm to the data (e.g. the pointer and capabilities, in this case) producing a signature which may be written to a target register RT. Any type of encryption may be used, including any type of block encryption such as advanced encryption standard (AES), data encryption standard (DES), international data encryption algorithm (IDEA), PRINCE, etc. A factor in determining the encryption algorithm to be used is latency of the algorithm. Accordingly, a single pass of encryption may be selected that is strong enough to protect the encrypted data to a desired level of security. A signature resulting from the encryption may then be shortened to match the field 22. The result in the target register may be of the form shown in FIG. 2.

Any set of capabilities may be defined in various embodiments. Generally, a capability may refer to a permission for one or more operations, or a restriction to one or more operations. In an embodiment, capabilities may include one or more of read permissions, write permissions, execute permissions, permissions based on the current privilege level, etc. The capabilities may also include an address range within which the pointer may be used to address memory (e.g. by adding offsets to the pointer). The address range may be defined in any fashion (e.g. base address and extent, minimum and maximum address, etc.).

A pointer may be an address that may be used (directly or indirectly) to access memory, subject to the permissions. In embodiments that employ address translation for memory management, the pointer may be a virtual address that is translated through the address translation mechanism to access memory. In embodiments that do not employ address translation, or during times that the address translation is disabled, the pointer may be a physical address to directly address memory (unmodified by any translation). The physical address may still be controlled by capabilities, in an embodiment.

Another embodiment of the signature generation instruction may operate on data being stored to memory. For example, the ystp instruction shown in FIG. 3 may store a pair of registers RS1 and RS2 to a location in the stack identified by the immediate field imm5. That is, the imm5 field may be an offset from the stack pointer. The ystp instruction may also sign at least one of the register values, or both in another embodiment, using the key and the selected encryption algorithm. While the ystp instruction stores a pair of registers to memory, a corresponding yst instruction may be defined that stores one register to memory (and generates a signature for the register data). Other instructions may store other numbers of registers to memory, and may generate signatures for any subset or all of the registers. Furthermore, other instructions may use other addressing modes and need not store the signed addresses on the stack.

Turning now to FIG. 4, a flowchart is shown illustrating one embodiment of modifying the capabilities of a pointer. For example, the operation of FIG. 4 may be performed by trusted software when assigning a pointer, or when assigning a corresponding translation for a page or pages to which the pointer points. The operation may be performed at other times if the trusted software determines that the capabilities should be changed. While the blocks are shown in a particular order for ease of understanding, other orders may be used. Instructions executed by the processor 10 and/or hardware in the processor 10 may implement the operation shown in FIG. 4.

The capabilities to be established/modified (and the pointer itself, if the pointer is newly assigned) may be written to a register or memory, forming an annotated pointer (i.e. annotated with the capabilities) (block 50). The signature may be generated by applying the selected encryption algorithm to the data, e.g. the annotated pointer and the key (block 52). The generated signature may be combined with the annotated pointer to form the signed, annotated pointer (or simply signed pointer, e.g. as shown in FIG. 2) (block 54). The signed, annotated pointer may be written to the destination register/memory (block 56).

Figure 5:
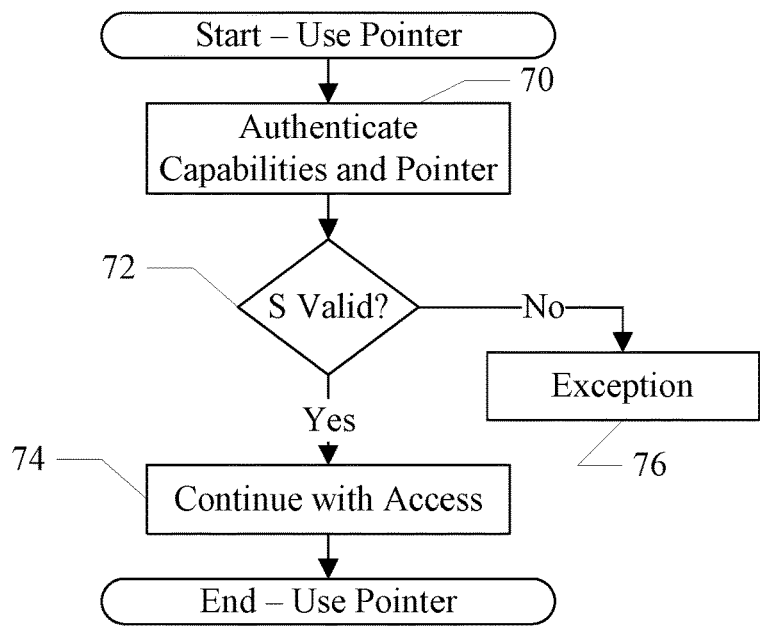
FIG. 5 is a flowchart illustrating the use of a pointer having capabilities.

Turning now to FIG. 5, a flowchart is shown illustrating one embodiment of authenticating a pointer. While the blocks are shown in a particular order for ease of understanding, other orders may be used. In an embodiment, the operation of FIG. 5 may be performed by the signature generation/authentication circuit 18 in response to an attempt to invoke the pointer for a memory access. That is, authentication may be an automatic hardware operation, in some embodiments. Authentication instructions may be supported as well, in some embodiments. Instructions executed by the processor 10 and/or hardware in the processor 10 may implement the operation shown in FIG. 5.

The signed pointer/capabilities may be authenticated by applying the same operation that was applied when the pointer was initially signed, and comparing the generated value to the signature (block 70). If the signature remains valid (i.e. the signature matches the signature in the signed, annotated pointer) (decision block 72, "yes" leg), the pointer may be used and thus operation may proceed to block 74 in FIG. 5. Proceeding with the access may include applying the capabilities to ensure that the access is permitted. If address translation is enabled, proceeding with the access may include translating the pointer to a physical address. Otherwise (decision block 72, "no" leg), the processor 10 may signal an exception on a memory operation that is attempting to use the pointer, to prevent the pointer from being used (block 76). Alternatively, the program that is attempting to use the pointer may be aborted in response to the failure of the authentication.

The pointer may be invoked if it is used as a fetch address, a branch target address, etc. for instruction fetching. The pointer may be invoked if it is used as a data pointer to access a memory operation (e.g. for a load/store instruction, in some instruction set architectures, or a memory operation of an instruction, in other instruction set architectures).

Figure 6:
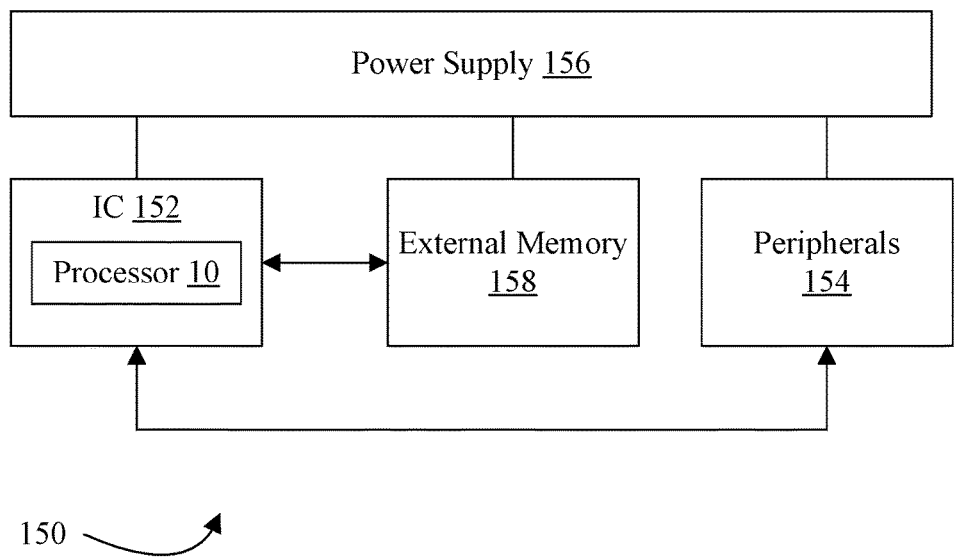
FIG. 6 is a block diagram of one embodiment of a system including the processor shown in FIG. 1.
Figure 7:
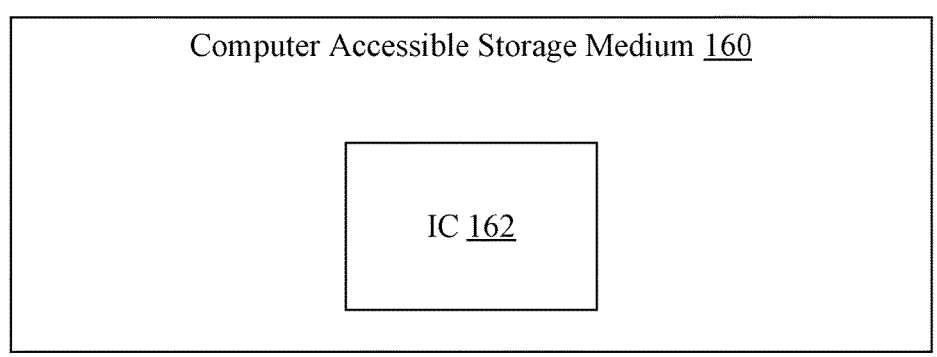
FIG. 7 is a block diagram of one embodiment of a computer accessible storage medium.

FIG. 6 is a block diagram of one embodiment of a system 150. In the illustrated embodiment, the system 150 includes at least one instance of an integrated circuit (IC) 152 coupled to one or more peripherals 154 and an external memory 158. A power supply 156 is provided which supplies the supply voltages to the IC 152 as well as one or more supply voltages to the memory 158 and/or the peripherals 154. The IC 152 may include one or more instances of the processor 10. In other embodiments, multiple ICs 152 may be provided with instances of the processor 10.

In one embodiment, the IC 152 may be a discrete processor 10. In other embodiments, the processor 10 may be integrated with other components on the IC 152. For example, other instances of the processor 10 may be included. In an embodiment, one or more processors 10 may be integrated with a memory controller for the memory 158. The IC 152 may be a system on a chip (SOC) including the processor 10 and various peripherals. Any level of integration may be used, and any desired set of other components may be used.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAIVIBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 152 in a chip-on-chip or package-on-package implementation.

FIG. 8 is a block diagram of one embodiment of a computer accessible storage medium 160 storing an electronic description of the IC 152 (reference numeral 162) is shown. More particularly, the description may include at least the processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the IC 152 stored on the computer accessible storage medium 160 may be a database which can be read by a program and used, directly or indirectly, to fabricate the hardware comprising the IC 152. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 152. The netlist may then be placed and routed to produce a data set describing geometric shapes to be applied to masks. The masks may then be used in various semiconductor fabrication steps to produce a semiconductor circuit or circuits corresponding to the IC 152. Alternatively, the description 162 on the computer accessible storage medium 300 may be the netlist (with or without the synthesis library) or the data set, as desired.

While the computer accessible storage medium 160 stores a description 162 of the IC 152, other embodiments may store a description 162 of any portion of the IC 152, as desired (e.g. the outer product engine 10 and/or the processor 12, as mentioned above).

Numerous variations and modifications will become apparent to those skilled in the art once the above disclosure is fully appreciated. It is intended that the following claims be interpreted to embrace all such variations and modifications.

What is claimed is:

1. A processor comprising:
one or more registers; and
an execution core coupled to the one or more registers, wherein the execution core is configured to perform a sign operation on a combination of a pointer and a corresponding set of capabilities to generate a value including at least a portion of: the pointer, the set of capabilities, and a signature resulting from the sign operation; wherein the value is stored for subsequent use and, prior to using the pointer and the set of capabilities, the execution core is configured to perform an authenticate operation responsive to the value, wherein the set of capabilities comprises at least one permission for a first operation using the pointer, and wherein the execution core is configured to perform the first operation responsive to the authenticate operation passing and further responsive to the permission for the first operation in the set of capabilities indicating that the first operation is permitted.

2. The processor as recited in claim 1 wherein the value is stored to a memory location.

3. The processor as recited in claim 1 wherein the value is stored to one of the one or more registers.

4. The processor as recited in claim 1 wherein the signature generated from the sign operation is reduced in size.

5. The processor as recited in claim 4 wherein the signature replaces a subset of bits of the pointer in the value.

6. The processor as recited in claim 4 wherein the signature replaces a subset of bits of the capabilities in the value.

7. The processor as recited in claim 4 wherein the signature replaces a first subset of bits of the capabilities and a second subset of bits of the pointer in the value.

8. The processor as recited in claim 4 wherein the execution core is configured to execute an instruction defined to generate the signature.

9. The processor as recited in claim 4 wherein the execution core includes a hardware circuit to authenticate the signature in response to invoking the pointer for memory access.

10. The processor as recited in claim 1 wherein the execution core is configured to abort a program that is attempting to use the pointer and the set of capabilities in response to the authentication failing.

11. The processor as recited in claim 1 wherein the execution core is configured to signal an exception on a memory operation that is attempting to use the pointer and the set of capabilities in response to the authentication failing.

12. A system comprising:
a memory; and
an integrated circuit coupled to the memory, the integrated circuit comprising a processor configured to:
generate a pointer to a memory location;
perform a sign operation on the pointer and a corresponding set of capabilities, wherein the processor is configured to generate a value including at least a portion of: the pointer, the set of capabilities, and a signature resulting from the sign operation;

detect an attempt to use the pointer in a first operation to access memory; and perform an authenticate operation responsive to the value prior to permitting the access to memory, wherein the set of capabilities comprises at least one permission for the first operation, and wherein the execution core is configured to perform the first operation responsive to the authenticate operation passing and further responsive to the permission for the first operation in the set of capabilities indicating that the first operation is permitted.

13. The system as recited in claim 12 wherein the processor is configured to store a value resulting from the sign operation in a location.

14. The system as recited in claim 13 wherein the location is a second memory location different from the memory location identified by the pointer.

15. The system as recited in claim 13 wherein location is a register in the processor.

16. The system as recited in claim 12 wherein the signature is reduced in size to be stored with the pointer and corresponding set of capabilities.

17. The system as recited in claim 16 wherein at least a portion of the reduced signature replaces a subset of bits of the pointer in the value.

18. The system as recited in claim 17 wherein a remaining portion of the signature replaces a subset of bits of the set of capabilities.

19. The system as recited in claim 16 wherein at least a portion of the reduced signature replaces a subset of bits of the capabilities in the value.

20. The system as recited in claim 12 wherein the processor is configured to abort a program that is attempting to use the value in response to the authentication failing.

* * * * *